(12) United States Patent
Groh et al.

(10) Patent No.: US 8,430,064 B2
(45) Date of Patent: Apr. 30, 2013

(54) ANIMAL CONTAINMENT/REPELLANT SYSTEM HAVING AN INTERNAL AND AN EXTERNAL ANTENNA

(75) Inventors: William S. Groh, Shenzhen (CN); Duane A. Gerig, Knoxville, TN (US); David M. Kozak, Bean Station, TN (US)

(73) Assignee: Radio Systems Corporation, Knoxville, TN (US)

( * ) Notice: Subject to any disclaimer, the term of this patent is extended or adjusted under 35 U.S.C. 154(b) by 414 days.

(21) Appl. No.: 12/710,840

(22) Filed: Feb. 23, 2010

(65) Prior Publication Data
US 2011/0203530 A1 Aug. 25, 2011

(51) Int. Cl.
*A01K 15/02* (2006.01)

(52) U.S. Cl.
USPC .......................................................... 119/721

(58) Field of Classification Search .................. 119/720, 119/721
See application file for complete search history.

(56) References Cited

U.S. PATENT DOCUMENTS

| 6,166,643 | A  | * | 12/2000 | Janning et al. ............. 340/573.3 |
| 6,415,742 | B1 | * | 7/2002  | Lee et al. ....................... 119/721 |
| 6,581,546 | B1 | * | 6/2003  | Dalland et al. ................ 119/712 |
| 7,142,167 | B2 | * | 11/2006 | Rochelle et al. .............. 343/867 |
| 2002/0050250 | A1 | * | 5/2002 | Peterson et al. .............. 119/721 |
| 2004/0021574 | A1 |   | 2/2004 | Frankewich, Jr. |
| 2005/0034683 | A1 | * | 2/2005 | Giunta ........................ 119/721 |
| 2005/0217606 | A1 | * | 10/2005 | Lee et al. ..................... 119/720 |
| 2005/0217607 | A1 | * | 10/2005 | Light et al. ................... 119/721 |
| 2007/0056526 | A1 | * | 3/2007  | Gianladis et al. ............. 119/721 |
| 2007/0113797 | A1 |   | 5/2007 | Mainini et al. |
| 2008/0168949 | A1 |   | 7/2008 | Belcher et al. |
| 2008/0168950 | A1 | * | 7/2008 | Moore ......................... 119/721 |
| 2010/0139576 | A1 | * | 6/2010 | Kim et al. ..................... 119/721 |

* cited by examiner

*Primary Examiner* — Son T Nguyen
*Assistant Examiner* — Shadi Baniani
(74) *Attorney, Agent, or Firm* — Pitts & Lake, PC

(57) ABSTRACT

Described is an animal containment/repellant system for, among other things, containing an animal within a containment area and simultaneously repelling the animal from a restricted area. More specifically, the animal containment/repellant system includes multiple signal transmitting antennas that simultaneously define multiple cooperating containment areas, restricted areas, or combination of containment and restricted areas.

30 Claims, 3 Drawing Sheets

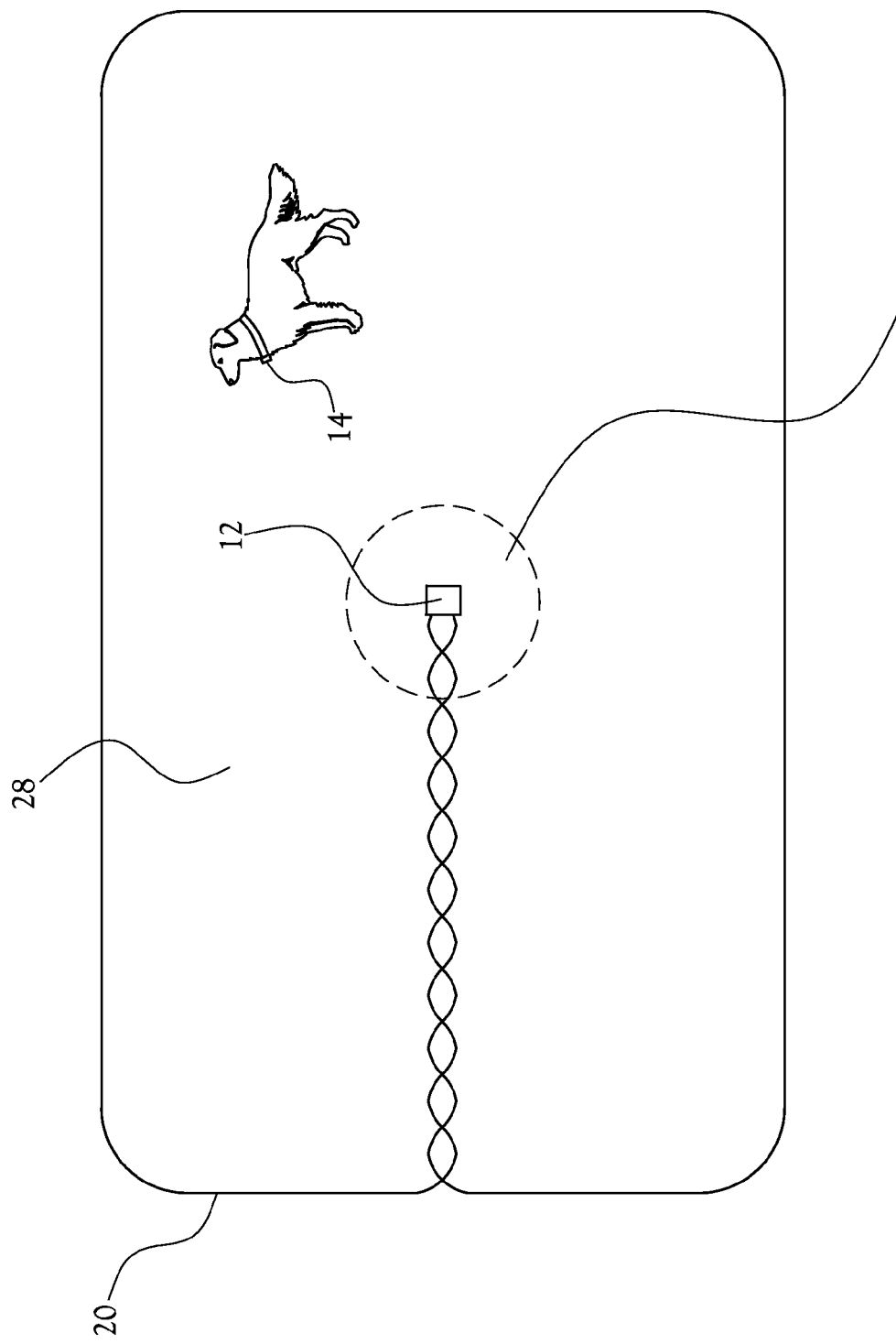

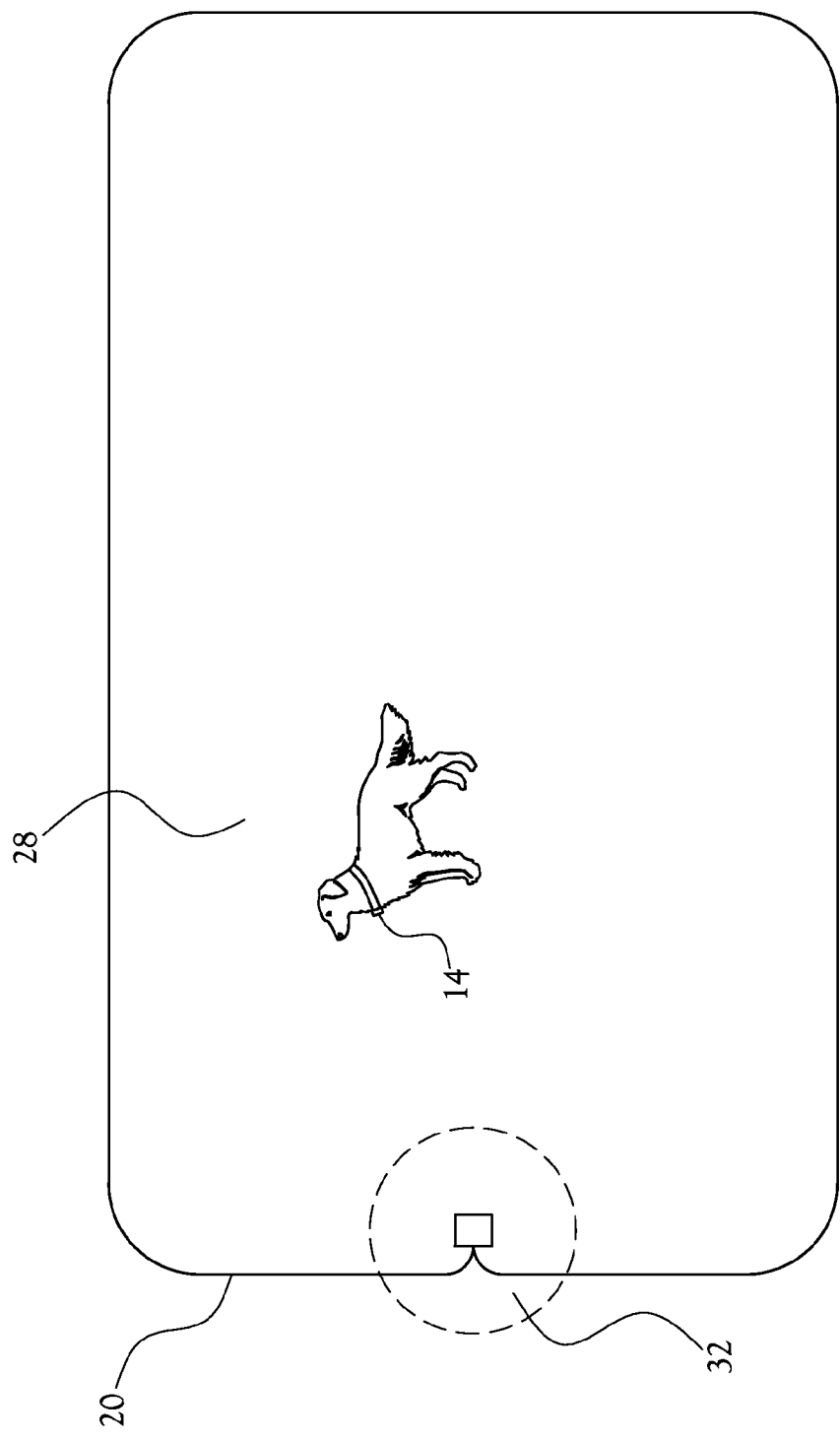

ANIMAL CONTAINMENT/REPELLANT SYSTEM HAVING AN INTERNAL AND AN EXTERNAL ANTENNA

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention pertains to a system for containing an animal within a containment area and/or repelling an animal from a restricted area.

BRIEF SUMMARY OF THE INVENTION

In accordance with the various features of the present invention there is provided an animal containment/repellant system for, among other things, containing an animal within a containment area and simultaneously repelling the animal from a restricted area. Generally, the system includes a base unit and a rover unit. The base unit includes a signal generating module, an internal antenna, and an external antenna. The internal antenna is disposed within the housing of the base unit, and the external antenna extends from the housing such that a substantial portion of the external antenna is disposed outside the housing. The signal generating module generates a first signal and drives the signal into the internal antenna such that the first signal radiates from the internal antenna. The signal generating module also generates a second signal and drives the signal into the external antenna such that the second signal radiates from the external antenna. The rover unit is carried by an animal and is responsive to each of the first and second signals. For example, the rover unit delivers a stimulus to the animal in response to receiving either the first signal or the second signal. Accordingly, the internal antenna and the external antenna are positioned in accordance with conventional knowledge to define containment and/or restricted areas. Because the animal containment/repellant system includes both an internal and an external antenna, the system is capable of simultaneously defining multiple cooperating containment areas, restricted areas, or combination of containment and restricted areas. Additionally, in one embodiment, the internal antenna and the external antenna are selectively activated such that the animal containment/repellant system contains or repels the animal using one of the internal antenna and the external antenna.

BRIEF DESCRIPTION OF THE SEVERAL VIEWS OF THE DRAWINGS

The above-mentioned features of the invention will become more clearly understood from the following detailed description of the invention read together with the drawings in which:

FIG. 2 illustrates one application of one embodiment of the animal containment/repellant system of FIG. 1; and FIG. 3 illustrates another application of one embodiment of the animal containment/repellant system of FIG. 1.

DETAILED DESCRIPTION OF THE INVENTION

Figure 1:
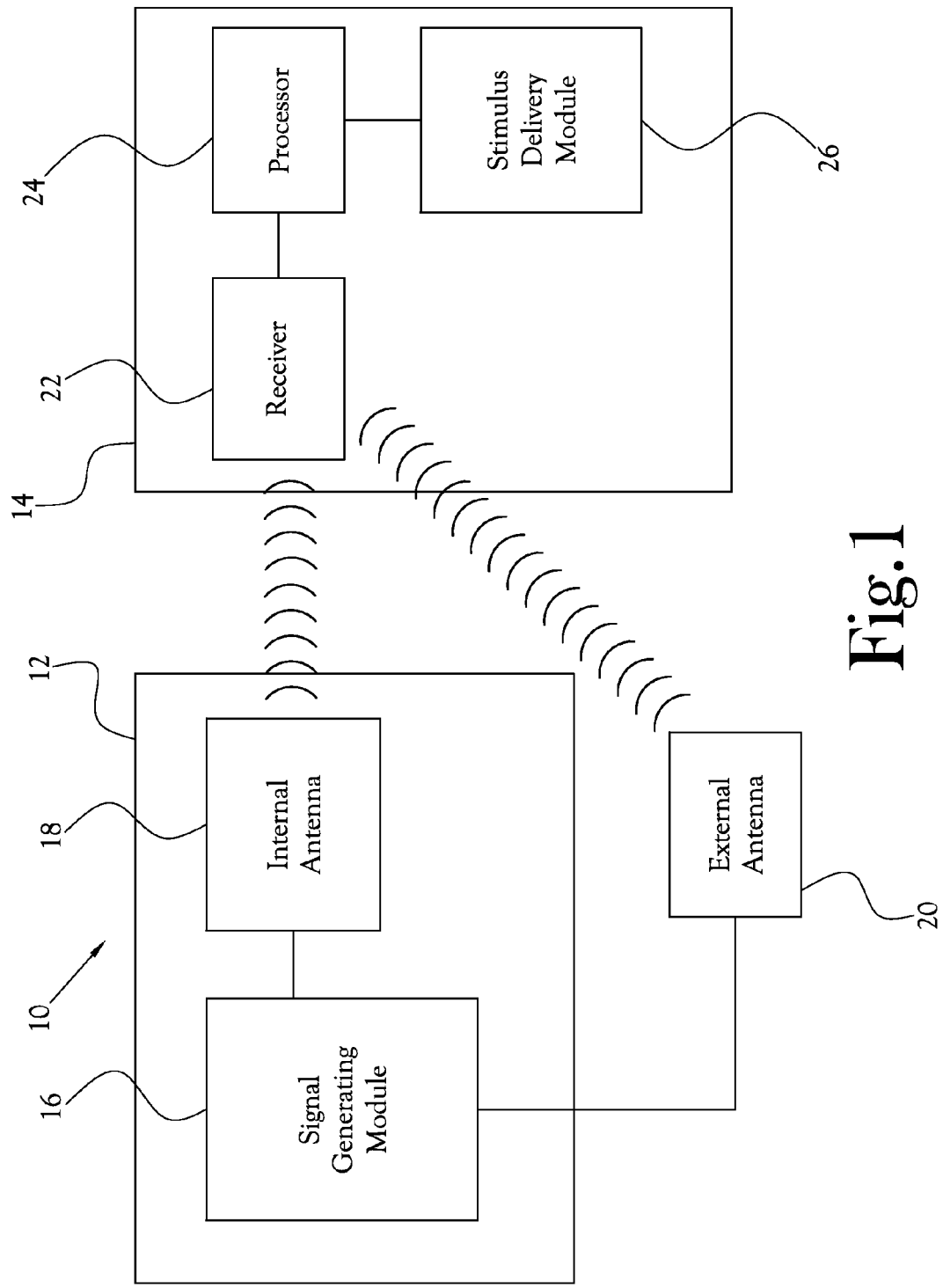
FIG. 1 is a block diagram of one embodiment the animal containment/repellant system in accordance with the various features of the present invention.

The present invention provides an animal containment/repellant system for, among other things, containing an animal within a containment area and simultaneously repelling the animal from a restricted area. More specifically, the animal containment/repellant system includes multiple signal transmitting antennas that simultaneously define multiple cooperating containment areas, restricted areas, or combination of containment and restricted areas. A block diagram of one embodiment of the animal containment/repellant system constructed in accordance with the various features of the present invention is illustrated generally at 10 in FIG. 1.

The animal containment/repellant system 10 includes a base unit 12 and a rover unit 14. The base unit 12 includes a housing, a signal generating module 16, an internal antenna 18, and an external antenna 20. The signal generating module 16 is disposed within the housing of the base unit 12 and is in electrical communication with the internal antenna 18 and the external antenna 20. The internal antenna 18 is also disposed within the housing of the base unit 12, and the external antenna 20 extends from the housing of the base unit 12 such that a substantial portion of the external antenna 20 is disposed outside the housing of the base unit 12. For example, in one embodiment, the internal antenna 18 is a coil antenna, and, in one embodiment, the external antenna 18 is a wire loop antenna.

The signal generating module 16 generates a first signal and a second signal and drives the first signal into the internal antenna 18 such that the first signal radiates from the internal antenna 18 and drives the second signal into the external antenna 20 such that the second signal radiates from the external antenna 20. As will be detailed in subsequent discussion, the first signal and the second signal define one or more containment areas, restricted areas, or a combination thereof. Additionally, although it will become clear in view of subsequent discussion, it should be noted that the first signal and the second signal can be distinguishable, such as by transmission frequencies, or can be indistinguishable, such as being identical, without departing from the scope or spirit of the present invention.

The rover unit 14 is adapted to be carried by an animal and includes a receiver 22, a processor 24, and a stimulus delivery module 26, the processor 24 being in electrical communication with the receiver 22 and the stimulus delivery module 26. The receiver 22 receives the first signal and the second signal and forwards any received signal to the processor 24. The processor 24 analyzes the received signal, and if the parameters of the received signal satisfy particular predetermined conditions, the processor 24 activates the stimulus delivery module 26 to deliver a stimulus to the animal. For example, in one embodiment, when the processor 24 determines that the signal strength of the received signal satisfies a predetermined threshold, that is, determines that the signal strength of the received signal is equal to or greater than the threshold, the processor 24 activates the stimulus delivery module 26 to deliver a stimulus to the animal.

FIG. 2 illustrates one application of one embodiment of the animal containment/repellant system 10 of FIG. 1. In the illustrated embodiment, the system 10 defines a containment area 28 and a restricted area 30 within the containment area 28. More specifically, the external antenna 20 is positioned to define the perimeter of the containment area 28, and the base unit 12 is positioned substantially at the center of the desired restricted area 30. As discussed above, the external antenna 20 radiates the second signal, and the internal antenna 18 radiates the first signal such that the first signal radiates from the base unit 12. In the illustrated embodiment, the processor 24 of the rover unit 14 activates the stimulus delivery module 26 to deliver a stimulus to the animal when the signal strength of the first signal at the receiver 22 satisfies a first predetermined threshold and when the signal strength of the second signal at the receiver 22 satisfies a second predetermined threshold.

Accordingly, when the rover unit 14 is carried by the animal, the animal is initially positioned within the containment area 28 and outside the restricted area 30. When the animal approaches the external antenna 20, that is, approaches the perimeter of the containment area 28, to the extent that the signal strength of the second signal at the receiver 22 satisfies the second threshold, the rover unit 14 delivers a stimulus to the animal, encouraging the animal to remain within the containment area 28 and thus containing the animal within the containment area 28. Additionally, when the animal approaches the internal antenna 18, namely the base unit 12, to the extent that the signal strength of the first signal at the receiver 22 reaches the first threshold, the rover unit 14 delivers a stimulus to the animal, encouraging the animal to remain outside the restricted area 30, thus repelling the animal from the restricted area 30.

Considering the application of the animal containment/repellant system 10 illustrated at FIG. 2, the base unit 12 can be positioned within, for example, a flower garden that is located within a pet owner's residential yard. Additionally, the second antenna 20 can positioned along the perimeter of the yard. The result is that the animal is contained within the pet owner's yard and is repelled from the pet owner's flower garden. In considering the above-discussed application, it should be noted that the restricted area 30 need not be defined within the containment area 28 to remain within the scope and spirit of the present invention.

FIG. 3 illustrates another application of one embodiment of the animal containment/repellant system 10 of FIG. 1. In this application, the system 10 defines the containment area 28 and a passageway 32. More specifically, the external antenna 20 is positioned to define the perimeter of the containment area 28, and the internal antenna 18 defines the passageway 32. Even more specifically, the base unit 12 is positioned with respect to the second antenna 20 such that the passageway 32 overlaps a portion of the second antenna 20. In this embodiment, the processor 24 of the rover unit 14 activates the stimulus delivery module 26 to deliver a stimulus to the animal when the signal strength of the second signal at the receiver 22 satisfies the second predetermined threshold. However, when the signal strength of the first signal at the receiver 22 satisfies the first predetermined threshold, the processor 24 does not activate the stimulus delivery module 26, regardless of the signal strength of the second signal at the receiver 22. Stated differently, when the rover unit 14 is within the passageway 32, the first signal overrides the second signal. The result is that the animal is able to enter and exit the containment area 28 by way of the passageway 32 without the rover unit 14 delivering a stimulus to the animal.

In one embodiment of the animal containment/repellant system 10, the internal antenna 18 and the external antenna 20 are selectively activated such that the system 10 contains or repels the animal, in accordance with the above discussion, using one of the internal antenna 18 and the external antenna 20. More specifically, in one embodiment, the signal generating module 16, in accordance with a user's selection, selectively generates and drives the first signal into the internal antenna 18 or the second signal into the external antenna 20 such that either the first signal radiates from the internal antenna 16 or the second signal radiates from the external antenna 18. In another embodiment, the signal generating module 16 is in selective electrical communication with the internal antenna 18 and the external antenna 20 such that, at a given time, the signal generating module 16 is in electrical communication with either the internal antenna 18 or the external antenna 20. This selective electrical communication can be established by, for example, an electrical switch or even physically connecting and disconnecting the internal antenna 18 and the external antenna 20 to and from the signal generating module 16. In this embodiment, the signal generating module 16 need only generate one of the first signal and the second signal such that it drives the generated signal into the selected antenna such that the signal radiates from the selected antenna.

Although specific applications and embodiments of the animal containment/repellant system 10 are illustrated and discussed above, it should be noted that embodiments, applications, and deployment schemes other than those illustrated and/or discussed above can be used without departing from the scope or spirit of the present invention. For example, the internal antenna 18 can define a containment area, and the external antenna 20 can define a restricted area. Additionally, the animal containment/repellant system 10 can be arranged to define progressive containment areas in the sense that the rover unit 14 delivers a stimulus having an increased intensity as the animal carries the rover unit 14 into each of the containment areas. Along these lines, the animal containment/repellant system 10 can also be arranged to define progressive restricted areas in the sense that the rover unit 14 delivers a stimulus having an increased intensity as the animal carries the rover unit 14 into each of the restricted areas.

Because the base unit 12 is positioned substantially at the center of the restricted area 30, the base unit 12 is often visible to those in the immediate area. For example, when the base unit 12 is positioned within a flower garden, such that the flower garden is within the restricted area 30, the base unit 12 is visible to those viewing the flower garden. Consequently, in one embodiment, the base unit 12 is designed to have aesthetic appeal. For example, the base unit 12 can be designed to resemble a stone, a yard gnome, a decorative mushroom, a pathway stone, or any other ornament that coordinates with the decor of the surrounding landscape.

From the foregoing description, those skilled in the art will recognize that an animal containment/repellant system providing advantages over the prior art has been provided. More specifically, the animal containment/repellant system includes multiple signal transmitting antennas that simultaneously define multiple cooperating containment areas, restricted areas, or combination of containment and restricted areas.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An animal containment/repellant system comprising:
   a base unit having a housing;
   a signal generating module disposed within the housing of said base unit, said signal generating module generates a first signal and a second signal;
   an internal antenna disposed within the housing of said base unit, said internal antenna in electrical communication with said signal generating module, said signal generating module drives the first signal into said internal antenna such that the first signal radiates from said internal antenna to define a first animal containment/repellant area;
   an external antenna in electrical communication with said signal generating module, said external antenna extending from the housing of said base unit such that a substantial portion of said external antenna is disposed outside the housing of said base unit, said signal generating module drives the second signal into said external antenna such that the second signal radiates from said external antenna to define a second animal containment/repellant area; and
   a rover unit adapted to be carried by an animal, said rover unit capable of receiving the first signal and the second signal, said rover unit being responsive to receiving the first signal, said rover unit being responsive to receiving the second signal.

2. The animal containment/repellant system of claim 1 wherein said internal antenna is a coil antenna.

3. The animal containment/repellant system of claim 1 wherein said external antenna is a wire loop antenna.

4. The animal containment/repellant system of claim 1 wherein the first signal is distinguishable from the second signal.

5. The animal containment/repellant system of claim 1 wherein the first signal is indistinguishable from the second signal.

6. The animal containment/repellant system of claim 1 wherein said rover unit delivers a stimulus to the animal in response to receiving the first signal.

7. The animal containment/repellant system of claim 6 wherein said rover unit delivers the stimulus to the animal when the signal strength of the first signal at said rover unit satisfies a predetermined threshold.

8. The animal containment/repellant system of claim 1 wherein said rover unit delivers a stimulus to the animal in response to receiving the second signal.

9. The animal containment/repellant system of claim 8 wherein said rover unit delivers the stimulus to the animal when the signal strength of the second signal at said rover unit satisfies a predetermined threshold.

10. The animal containment/repellant system of claim 1 wherein the first signal defines a restricted area.

11. The animal containment/repellant system of claim 1 wherein the first signal defines a passageway.

12. The animal containment/replant system of claim 1 wherein the first signal defines a containment area.

13. The animal containment/repellant system of claim 1 wherein the second signal defines a perimeter of a containment area.

14. The animal containment/repellant system of claim 13 wherein said rover unit responds to receiving the first signal by not delivering a stimulus to the animal regardless of whether said rover unit is receiving the second signal, thus defining a passageway through the perimeter of the containment area.

15. The animal containment/repellant system of claim 1 wherein said internal antenna and said external antenna are selectively activated.

16. The animal containment/repellant system of claim 15 wherein said signal generating module selectively drives the first signal into said internal antenna or the second signal into said external antenna such that either the first signal radiates from said internal antenna or the second signal radiates from said external antenna.

17. The animal containment/repellant system of claim 1 wherein the housing of said base unit is designed to have aesthetic appeal.

18. The animal containment/repellant system of claim 17 wherein said housing has the appearance of a gnome, a yard ornament, or a stone.

19. An animal containment/repellant system comprising:
   a base unit having a housing, said base unit comprising:
   a signal generating module disposed within the housing, said signal generating module generates a first signal and a second signal;
   an internal antenna disposed within the housing, said internal antenna in electrical communication with said signal generating module, said signal generating module drives the first signal into said internal antenna such that the first signal radiates from said internal antenna to define a first animal containment/repellant area;
   an external antenna in electrical communication with said signal generating module, said external antenna extending from the housing such that a substantial portion of said external antenna is disposed outside the housing, said signal generating module drives the second signal into said external antenna such that the second signal radiates from said external antenna to define a second animal containment/repellant area; and
   a rover unit adapted to be carried by an animal, said rover unit comprising:
   a receiver that receives the first signal and the second signal;
   a stimulus delivery module that delivers a stimulus to the animal;
   a processor in electrical communication with said receiver and said stimulus delivery module, said processor activates said stimulus delivery module to deliver the stimulus to the animal when said receiver receives the first signal or the second signal.

20. The animal containment/repellant system of claim 19 wherein said rover unit delivers the stimulus to the animal when the signal strength of the first signal at said receiver satisfies a predetermined first threshold, said rover unit delivers the stimulus to the animal when the signal strength of the second signal at said receiver satisfies a predetermined second threshold.

21. The animal containment/repellant system of claim 19 wherein said internal antenna and said external antenna are selectively activated.

22. The animal containment/repellant system of claim 21 wherein said signal generating module selectively drives the first signal into said internal antenna or the second signal into said external antenna such that either the first signal radiates from said internal antenna or the second signal radiates from said external antenna.

23. An animal containment/repellant system comprising:
   a base unit having a housing;
   a signal generating module disposed within the housing of said base unit, said signal generating module generates a first signal and a second signal;

an internal antenna disposed within the housing of said base unit, said internal antenna in electrical communication with said signal generating module, said signal generating module drives the first signal into said internal antenna such that the first signal radiates from said internal antenna to define a first animal containment/repellant area, the first signal being receivable by a rover unit adapted to be carried by an animal; and an external antenna in electrical communication with said signal generating module, said external antenna extending from the housing of said base unit such that a substantial portion of said external antenna is disposed outside the housing of said base unit, said signal generating module drives the second signal into said external antenna such that the second signal radiates from said external antenna to define a second animal containment/repellant area, the second signal being receivable by the rover unit.

24. The animal containment/repellant system of claim 23 wherein the rover unit is responsive to receiving the first signal and is responsive to receiving the second signal.

25. The animal containment/repellant system of claim 23 wherein said internal antenna and said external antenna are selectively activated.

26. The animal containment/repellant system of claim 25 wherein said signal generating module selectively drives the first signal into said internal antenna or the second signal into said external antenna such that either the first signal radiates from said internal antenna or the second signal radiates from said external antenna.

27. An animal containment/repellant system comprising:
a base unit having a housing;
an internal antenna disposed within the housing of said base unit;
an external antenna extending from the housing of said base unit such that a substantial portion of said external antenna is disposed outside the housing of said base unit; and
a signal generating module disposed within the housing of said base unit, said signal generating module in selective electrical communication with said internal antenna and said external antenna such that said signal generating module is in electrical communication with said internal antenna when said internal antenna is selected and is in electrical communication with said external antenna when said external antenna is selected, said signal generating module generates a signal, said signal generating module drives the signal into said internal antenna such that the signal radiates from said internal antenna to define a first animal containment/repellant area when said internal antenna is selected, said signal generating module drives the signal into said external antenna such that the signal radiates from said external antenna to define a second animal containment/repellant area when said external antenna is selected, said signal generating module drives the signal into said internal and external antenna such that the signal radiates from said internal and external antenna to respectively define cooperating first and second animal containment/repellant areas when both of said internal and external antenna are selected, the radiated signal is receivable by a rover unit.

28. The animal containment/repellant system of claim 27 further comprising an electrical switch in electrical communication with said signal generating module and said internal antenna and said external antenna, said electrical switch facilitating the selective electrical communication.

29. The animal containment/repellant system of claim 27 wherein said internal antenna and said external antenna are in terminable electrical communication with said signal generating module such that the selective electrical communication is accomplished by connecting and disconnecting the electrical communication between said internal antenna and said signal generating module and connecting and disconnecting the electrical communication between said external antenna and said signal generating module.

30. The animal containment/repellant system of claim 27 wherein the rover unit is responsive to receiving the first signal and is responsive to receiving the second signal.

* * * * *